United States Patent
Usuda et al.

(10) Patent No.: US 7,889,698 B2
(45) Date of Patent: Feb. 15, 2011

(54) TRANSMISSION RATE CONTROL METHOD, MOBILE STATION, AND RADIO NETWORK CONTROLLER

(75) Inventors: Masafumi Usuda, Tokyo (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 865 days.

(21) Appl. No.: 11/506,842

(22) Filed: Aug. 21, 2006

(65) Prior Publication Data

US 2007/0047500 A1 Mar. 1, 2007

(30) Foreign Application Priority Data

Aug. 23, 2005 (JP) .......................... P2005-241686

(51) Int. Cl.
*H04W 4/00* (2009.01)
(52) U.S. Cl. ...................... 370/331; 370/335; 455/439
(58) Field of Classification Search ................ 370/331, 370/335; 455/439
See application file for complete search history.

(56) References Cited

U.S. PATENT DOCUMENTS

| 2005/0025077 | A1* | 2/2005 | Balasubramanian et al. | 370/310 |
| 2006/0040674 | A1* | 2/2006 | Vannithamby et al. ... | 455/452.2 |
| 2006/0166673 | A1* | 7/2006 | Vasudevan ................. | 455/439 |
| 2006/0274689 | A1* | 12/2006 | Li et al. ....................... | 370/329 |

FOREIGN PATENT DOCUMENTS

| TW | 200306098 A | 11/2003 |
| TW | 200308157 A | 12/2003 |
| TW | 200400724 A | 1/2004 |
| WO | WO 2004/064426 A1 | 7/2004 |

OTHER PUBLICATIONS

Universal Mobile Telecommunications System (UMTS); FDD enhanced uplink; Overall description; Stage 2 (3GPP TS 25.309 version 6.2.0 Release 6), ETSI Standards, European Telecommunications Standards Institute, Sophia-Antipo, FR, vol. 3-R2, No. V620, Mar. 2005, XP014027653, p. 1-p. 31.
Official Action Letter issued on Jul. 20, 2007 in the counterpart Korean Patent Application.
3GPP TS 25.309 V6.3.0 (Jun. 2005), 3rd Generation Partnership Project; Technical Specification Group Radio Access Network; FDD Enhanced Uplink; Overall description; Stage 2 (Release 6), p. 1-33.

* cited by examiner

Primary Examiner—Barry W Taylor
(74) Attorney, Agent, or Firm—Marvin A. Motsenbocker; Mots Law, PLLC

(57) ABSTRACT

A transmission rate control method for controlling, at a mobile station, a transmission rate of uplink user data, based on a dedicated absolute transmission rate of uplink user data received via a dedicated E-AGCH which is transmitted using a dedicated identifier for the mobile station or a common absolute transmission rate of uplink user data received via a common E-AGCH which is transmitted using a common identifier for mobile stations which satisfy a predetermined condition, includes: storing, at the mobile station, the common absolute transmission rate of the uplink user data received via the common E-AGCH; and deleting, at the mobile station, the stored common absolute transmission rate of the uplink user data when changing a serving cell for the mobile station.

4 Claims, 14 Drawing Sheets

FIG. 1
PRIOR ART
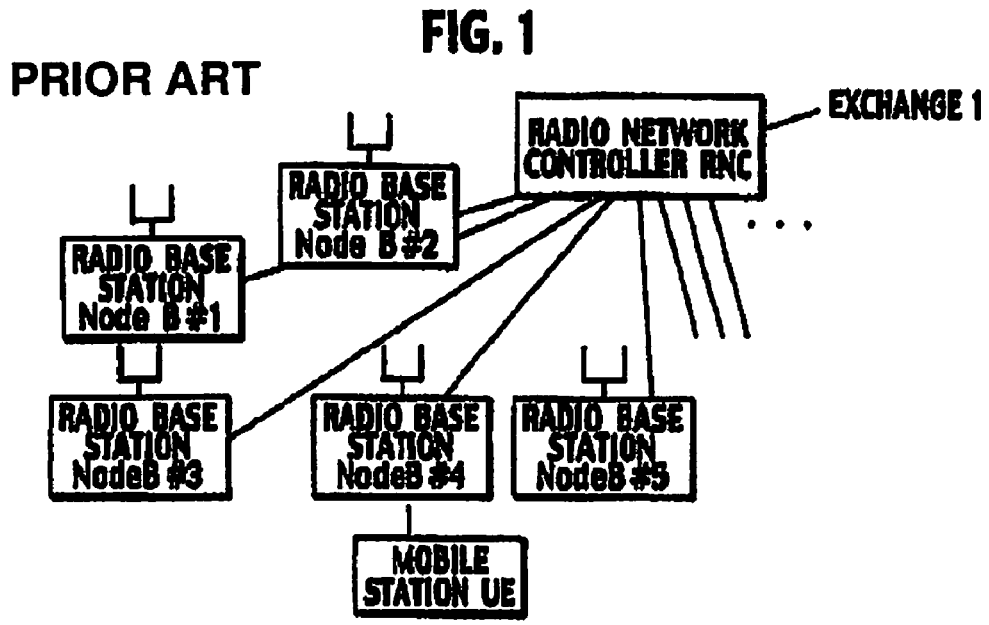
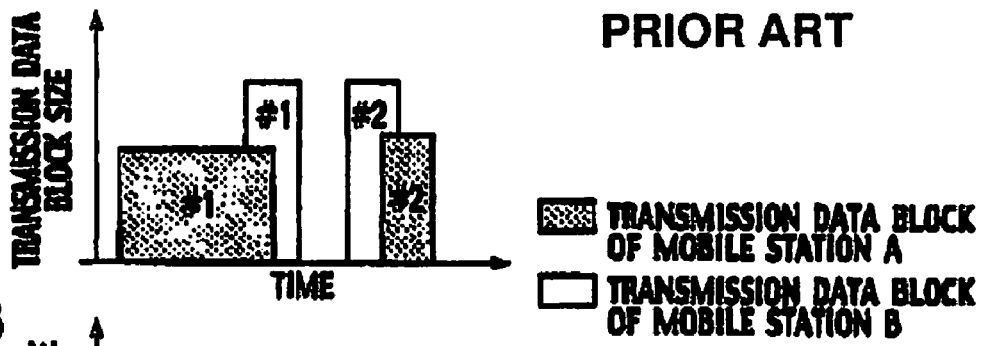
FIG. 2A PRIOR ART
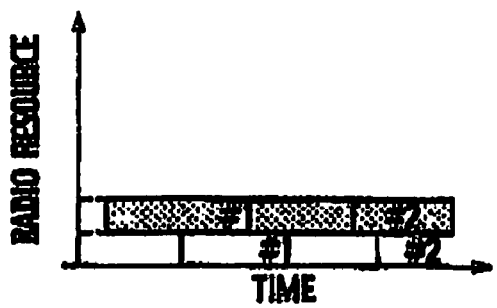
FIG. 2B PRIOR ART
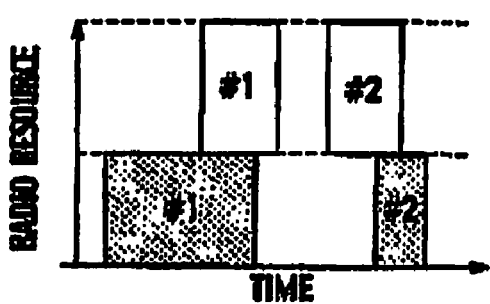
FIG. 2C PRIOR ART

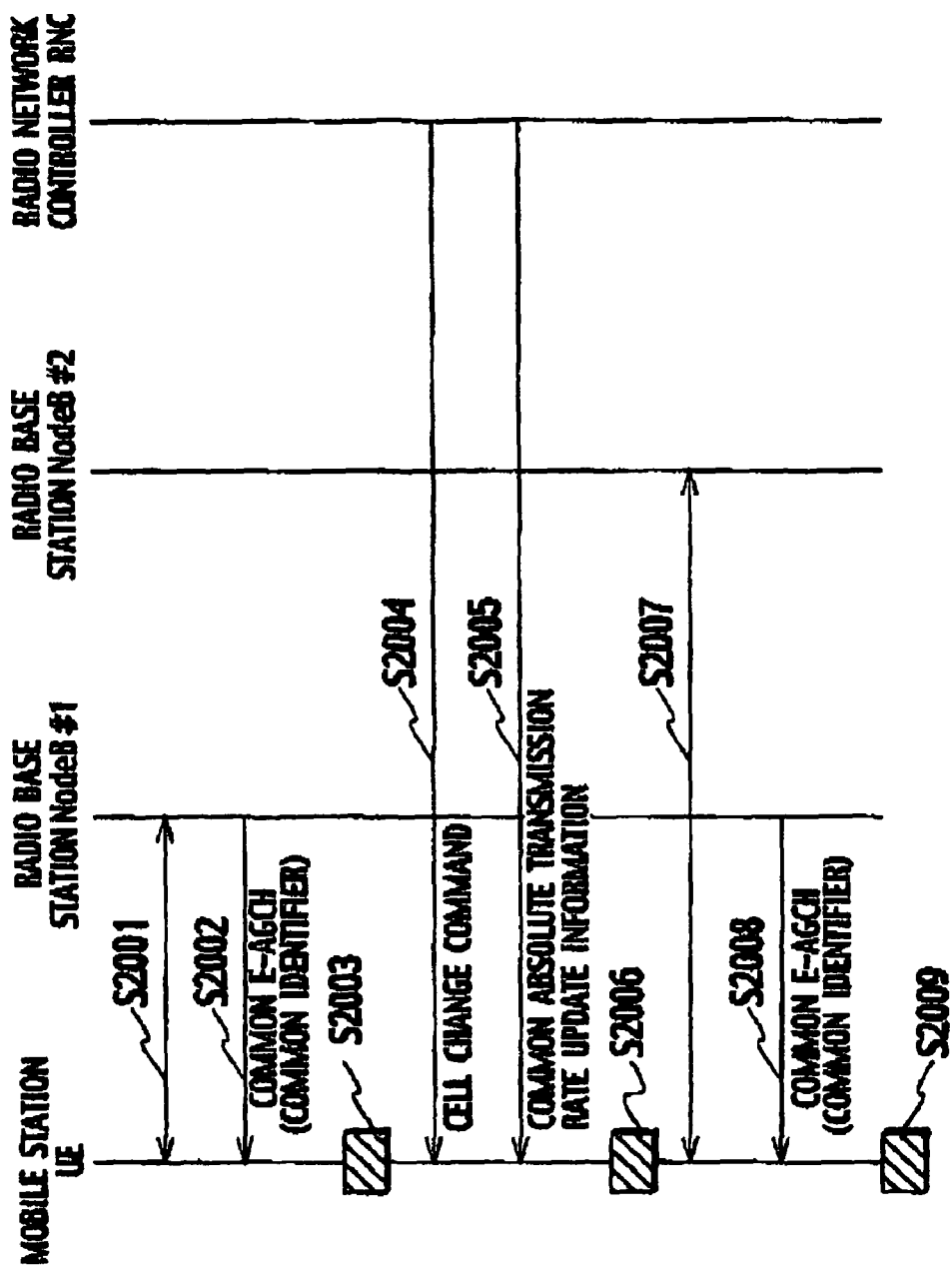

TRANSMISSION RATE CONTROL METHOD, MOBILE STATION, AND RADIO NETWORK CONTROLLER

CROSS REFERENCE TO RELATED APPLICATION

This application is based upon and claims the benefit of priority from the prior Japanese Patent Application No. P2005-241686, filed on Aug. 23, 2005; the entire contents of which are incorporated herein by reference.

BACKGROUND OF THE INVENTION

1. Field of the Invention

The present invention relates to a transmission rate control method for controlling a transmission rate of uplink user data, based on a dedicated absolute transmission rate of uplink user data received at a mobile station via a dedicated absolute transmission rate control channel which is transmitted using a dedicated identifier for the mobile station or a common absolute transmission rate of uplink user data received at a mobile station via a common absolute transmission rate control channel which is transmitted using a common identifier for mobile stations which satisfy a predetermined condition, and a mobile station and a radio network controller which are used in the transmission rate control method.

2. Description of the Related Art

In a conventional mobile communication system, when setting a Dedicated Physical Channel (DPCH) between a mobile station UE and a radio base station Node B, a radio network controller RNC is configured to determine a transmission rate of uplink user data, in consideration of hardware resources for receiving of the radio base station Node B (hereinafter, hardware resource), a radio resource in an uplink (an interference volume in an uplink), a transmission power of the mobile station UE, a transmission processing performance of the mobile station UE, a transmission rate required for an upper application, or the like, and to notify the determined transmission rate of the uplink user data by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of uplink user data (for example, per approximately 1 through 100 ms), due to the increase of processing load and processing delay in the radio network controller RNC.

In addition, in the conventional mobile communication system, there has been also a problem that costs for implementing an apparatus and for operating a network are substantially increased even if the fast control for changing of the transmission rate of the uplink user data can be performed.

Therefore, in the conventional mobile communication system, control for changing of the transmission rate of the uplink user data is generally performed on the order from a few hundred ms to a few seconds.

Accordingly, in the conventional mobile communication system, when burst data transmission is performed as shown in FIG. 2A, the data are transmitted by accepting low-speed, high-delay, and low-transmission efficiency as shown in FIG. 2B, or, as shown in FIG. 2C, by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2B and 2C.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the uplink radio resources effectively. Such discussions or discussed functions will be hereinafter referred to as "Enhanced Uplink (EUL)".

Referring to FIG. 3, the mobile communication system, to which the "Enhanced Uplink" is applied, is explained. In FIG. 3, a serving cell for the mobile station UE is changed from cell#3 which is controlled by a radio base station Node B #1 to cell #4 which is controlled by a radio base station Node B #2. The serving cell mainly controls the transmission rate of uplink user data transmitted by the mobile station UE.

In addition, the mobile station UE is configured to switch a "dedicated transmission rate control (dedicated rate control)" and a "common transmission rate control (common rate control)" flexibly.

The "dedicated transmission rate control" means controlling the transmission rate of the uplink user data based on the dedicated absolute transmission rate of the uplink user data received at the mobile station UE via a "Dedicated Enhanced Absolute Grant Channel (E-AGCH, dedicated absolute transmission control channel)", which is transmitted using the dedicated identifier for the mobile station UE.

The "common transmission rate control" means controlling the transmission rate of the uplink user data based on the common absolute transmission rate of the uplink user data received at the mobile station UE via a "Common Enhanced Absolute Grant Channel (E-AGCH, common absolute transmission control channel)", which is transmitted using the common identifier for the mobile stations belonging to the specific cell (specific group).

Here, when the mobile station UE performing the dedicated transmission rate control receives the Common E-AGCH, the mobile station UE stores the common absolute transmission rate transmitted by the Common E-AGCH. When the Dedicated E-AGCH becomes "Inactive", the mobile station UE updates the transmission rate of the uplink user data based on the stored common absolute transmission rate. Then, the mobile station UE controls the transmission rate of the uplink user data based on the common absolute transmission rate received via the Common E-AGCH.

Thus, the mobile station UE performing the dedicated transmission rate control can switch from the dedicated transmission rate control to the common transmission rate control smoothly, by storing the common absolute transmission rate transmitted by the Common E-AGCH.

However, in the conventional mobile communication system as described above, when the serving cell for the mobile station UE is changed due to the cell change, and when the common absolute transmission rate indicated by the Common E-AGCH which the current serving cell signals is drastically different from the common absolute transmission rate indicated by the Common E-AGCH which the previous serving cell signals, the mobile station UE is configured to transmit the uplink user data using the inappropriate transmission rate of the uplink user data toward the current serving cell, until the mobile station UE receives the Common E-AGCH from the current serving cell after the cell change.

Accordingly, there has been a problem that the radio resource is not used efficiently.

BRIEF SUMMARY OF THE INVENTION

The present invention has been made considering the problems, and its object is to provide a transmission rate control method, a mobile station and a radio network controller, which can switch from a dedicated transmission rate control to a common transmission rate control smoothly, and to use a radio resource efficiently.

A first aspect of the present invention is summarized as a transmission rate control method for controlling, at a mobile station, a transmission rate of uplink user data, based on a dedicated absolute transmission rate of uplink user data received via a dedicated absolute transmission rate control channel which is transmitted using a dedicated identifier for the mobile station or a common absolute transmission rate of uplink user data received via a common absolute transmission rate control channel which is transmitted using a common identifier for mobile stations which satisfy a predetermined condition, including: storing, at the mobile station, the common absolute transmission rate of the uplink user data received via the common absolute transmission rate control channel; and deleting, at the mobile station, the stored common absolute transmission rate of the uplink user data when changing a serving cell for the mobile station.

A second aspect of the present invention is summarized as a transmission rate control method for controlling, at a mobile station, a transmission rate of uplink user data, based an a dedicated absolute transmission rate of uplink user data received via a dedicated absolute transmission rate control channel which is transmitted using a dedicated identifier for the mobile station or a common absolute transmission rate of uplink user data received via a common absolute transmission rate control channel which is transmitted using a common identifier for mobile stations which satisfy a predetermined condition, including: storing, at the mobile station, the common absolute transmission rate of the uplink user data received via the common absolute transmission rate control channel; and updating, at the mobile station, the stored common absolute transmission rate of the uplink user data based on update information on an absolute transmission rate of uplink user data which is transmitted from a radio network controller, when changing a serving cell for the mobile station.

In the first or second aspect, the mobile station can store the common absolute transmission rate of the uplink user data received via the common absolute transmission rate control channel, even when the mobile station controls the transmission rate of the uplink user data based on the dedicated absolute transmission rate of the uplink user data received via the dedicated absolute transmission rate control channel.

A third aspect of the present invention is summarized as a mobile station for controlling a transmission rate of uplink user data, based on a dedicated absolute transmission rate of uplink user data received via a dedicated absolute transmission rate control channel which is transmitted using a dedicated identifier for the mobile station or a common absolute transmission rate of uplink user data received via a common absolute transmission rate control channel which is transmitted using a common identifier for mobile stations which satisfy a predetermined condition, including: a common absolute transmission rate storage configured to store the common absolute transmission rate of the uplink user data received via the common absolute transmission rate control Channel; and wherein the common absolute transmission rate storage is configured to delete the stored common absolute transmission rate of the uplink user data when a serving cell for the mobile station is changed.

A fourth aspect of the present invention is summarized as a mobile station for controlling a transmission rate of uplink user data, based on a dedicated absolute transmission rate of uplink user data received via a dedicated absolute transmission rate control channel which is transmitted using a dedicated identifier for the mobile station or a common absolute transmission rate of uplink user data received via a common absolute transmission rate control channel which is transmitted using a common identifier for mobile stations which satisfy a predetermined condition, including: a common absolute transmission rate storage configured to store the common absolute transmission rate of the uplink user data received via the common absolute transmission rate control channel; and wherein the common absolute transmission rate storage is configured to update the stored common absolute transmission rate of the uplink user data based on update information on an absolute transmission rate of uplink user data which is transmitted from a radio network controller, when a serving call for the mobile station is changed.

In the third or fourth aspect, the common absolute transmission rate storage can be configured to store the common absolute transmission rate of the uplink user data received via the common absolute transmission rate control channel, even when the mobile station controls the transmission rate of the uplink user data based on the dedicated absolute transmission rate of the uplink user data received via the dedicated absolute transmission rate control channel.

A fifth aspect of the present invention is summarized as a radio network controller used in a mobile communication system for controlling, at a mobile station, a transmission rate of uplink user data, based on a dedicated absolute transmission rate of uplink user data received via a dedicated absolute transmission rate control channel which is transmitted using a dedicated identifier for the mobile station or a common absolute transmission rate of uplink user data received via a common absolute transmission rate control channel which is transmitted using a common identifier for mobile stations which satisfy a predetermined condition, wherein the radio network controller is configured to update a common absolute transmission rate of uplink user data which is stored in the mobile station by transmitting update information on an absolute transmission rate of uplink user data to the mobile station, when the mobile station is changing a serving cell.

BRIEF DESCRIPTION OF THE SEVERAL VIEWS OF THE DRAWINGS

FIG. 1 is diagram of an entire configuration of a general mobile communication system.

FIGS. 2A to 2C are graphs for explaining the method for controlling a transmission rate of uplink user data in a conventional mobile communication system.

FIG. 17 is a sequence diagram showing operations of transmission rate control method in the mobile communication system according to the first embodiment of the present invention.

DETAILED DESCRIPTION OF THE INVENTION

Configuration of Mobile Communication System According to First Embodiment of the Present Invention Referring to FIGS. 4 to 16, a configuration of a mobile communication system according to a first embodiment of the present invention will be described.

It should be noted that, the mobile communication system according to this embodiment is designed in order to increase a communication performance such as a communication capacity, a communication quality and the like. Further, the mobile communication system according to this embodiment can be applied to "W-CDMA" and "CDMA2000" of the third generation mobile communication system.

Figure 3:
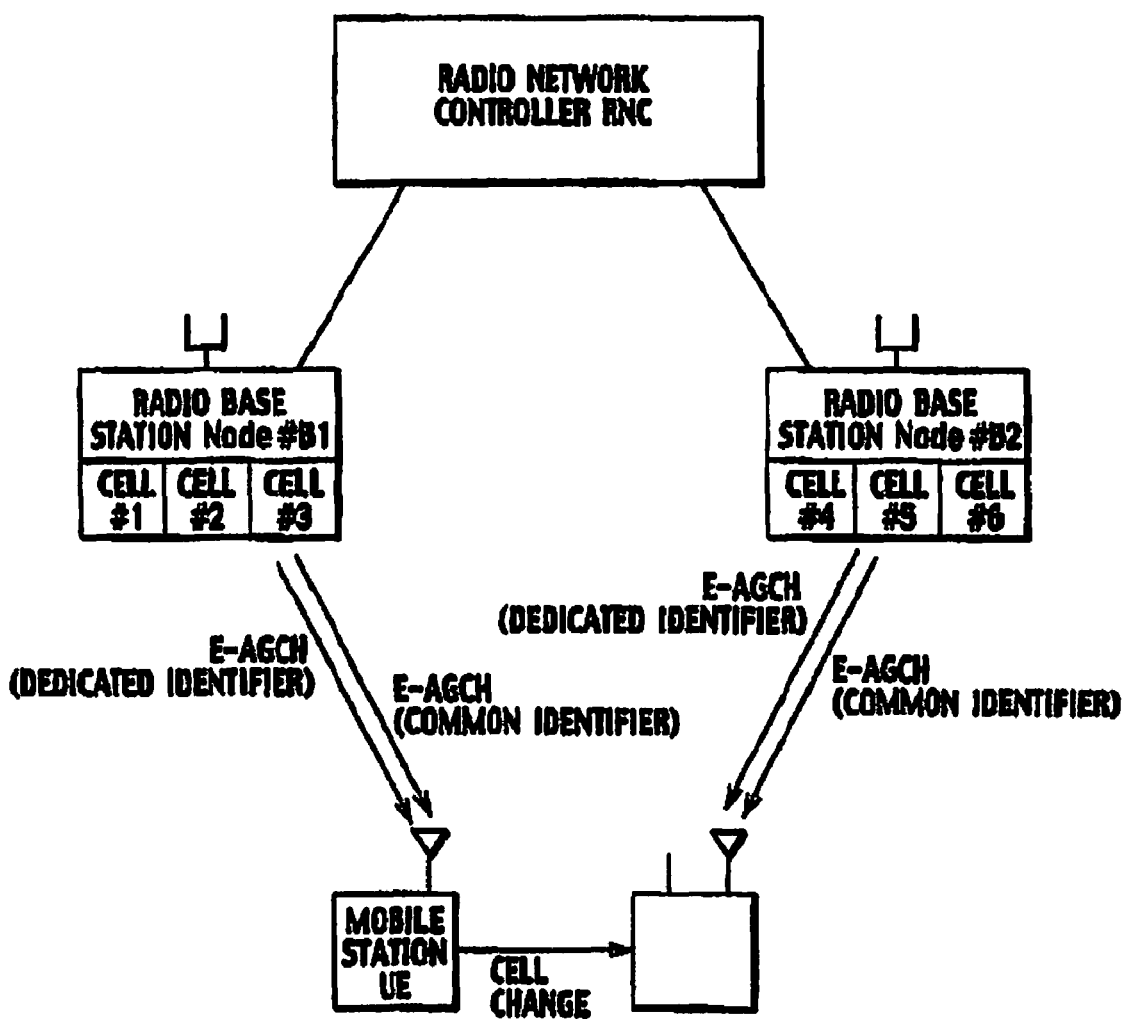
FIG. 3 is a diagram of an entire configuration of the conventional mobile communication system.
Figure 4:
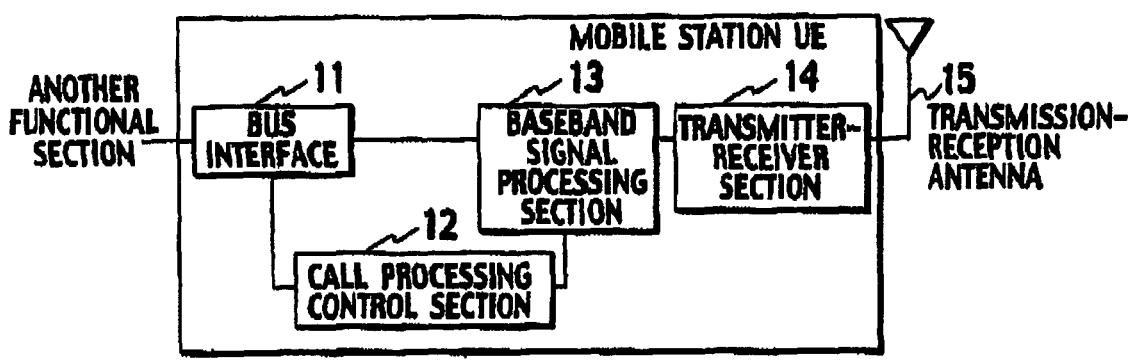
FIG. 4 is a functional block diagram of a mobile station in the mobile communication system according to the first embodiment of the present invention.

An example of general configuration of a mobile station UE according to this embodiment is shown in FIG. 4.

As shown in FIG. 4, the mobile station UE is provided with a bus interface 11, a call processing control section 12, a baseband signal processing section 13, a transmitter-receiver section 14, and a transmission-reception antenna 15. In addition, the mobile station UE can be configured to include an amplifier section (not shown in FIG. 4).

However, these functions do not have to be independently present as hardware. That is, these functions can be partly or entirely integrated, or can be configured through a process of software.

Figure 5:
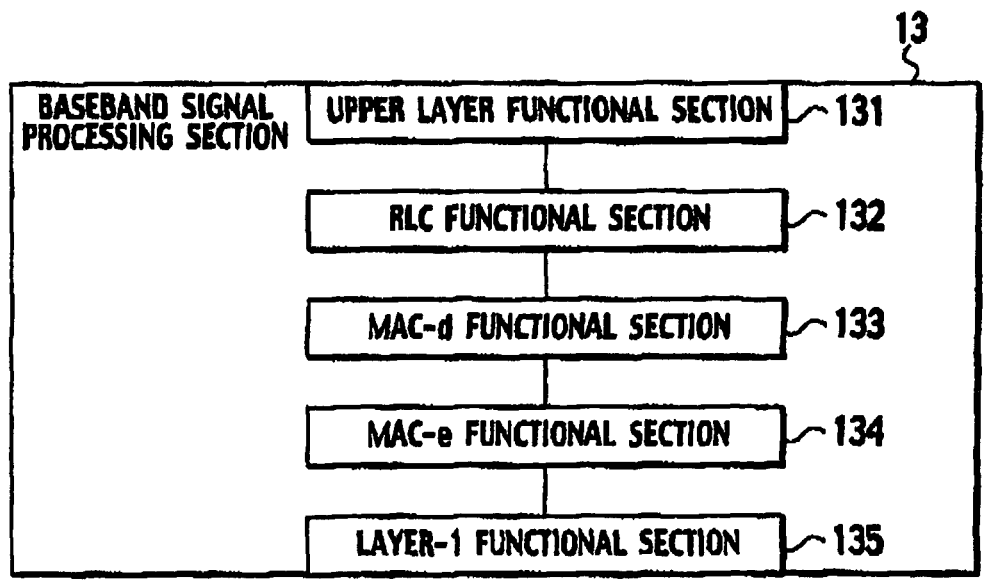
FIG. 5 is a functional block diagram of a baseband signal processing section of the mobile station in the mobile communication system according to the first embodiment of the present invention.

In FIG. 5, a functional block of the baseband signal processing section 13 is shown.

As shown in FIG. 5, the baseband signal processing section 13 is provided with an upper layer functional section 131, a RLC functional section 132, a MAC-d functional section 133, a MAC-e functional section 134, and a layer-1 functional section 135.

The RLC functional section 132 is configured to work as a RLC sublayer. The layer-1 functional section 135 is configured to work as a layer-1.

Figure 6:
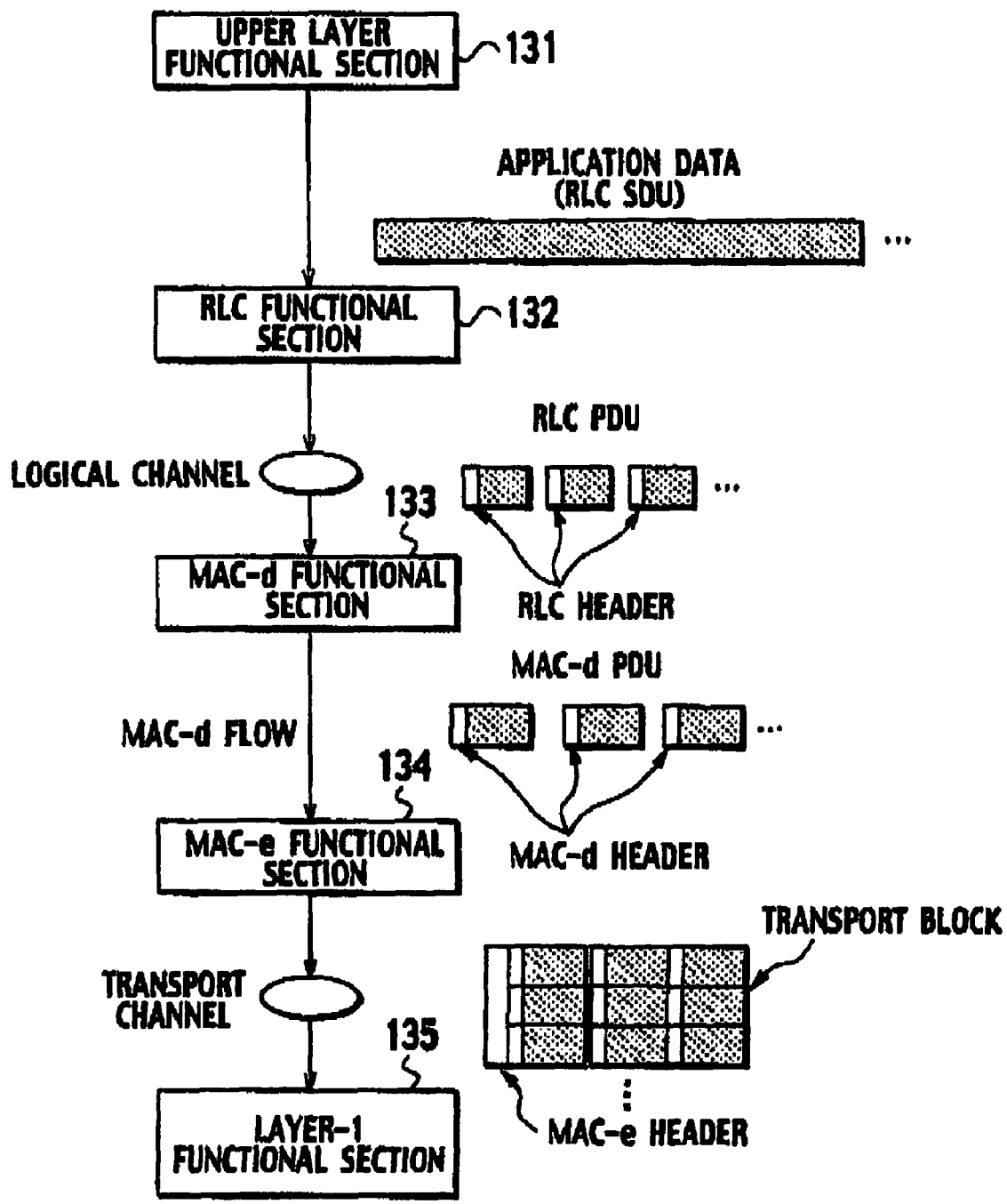
FIG. 6 is a diagram for explaining functions of the baseband signal processing section of the mobile station in the mobile communication system according to the first embodiment of the present invention.

As shown in FIG. 6, the RLC functional section 132 is configured to divide an application data (RLC SDU), which is received from the upper layer functional section 131, into PDUs of a predetermined PDU size. Then, the RLC functional section 132 is configured to generate RLC PDUs by adding a RLC header used for a sequence control processing, retransmission processing, and the like, so as to pass the RLC PDUs to the MAC-d functional section 133.

Here, a pipeline works as a bridge between the RLC functional section 132 and the MAC-d functional section 133 is a "logical channel". The logical channel is classified based on the contents of data to be transmitted/received, and when a communication is performed, it is possible to establish a plurality of logical channels in one connection. In other words, when the communication is performed, it is possible to transmit/receive a plurality of data with different contents (for example, control data and user data, or the like) logically in parallel.

The MAC-d functional section 133 is configured to multiplex the logical channels, and to add a MAC-d header associated with the multiplex of the logical channels, so as to generate a MAC-d PDU. A plurality of MAC-d PDUs are transferred from the MAC-d functional section 133 to the MAC-e functional section 134 as MAC-d flow.

The MAC-e functional section 134 is configured to assemble a plurality of MAC-d PDUs which are received from the MAC-d functional section 133 as MAC-d flow, and to add a MAC-e header to the assembled MAC-d PDU, so as to generate a transport block. Then, the MAC-e functional section 134 is configured to pass the generated transport block to the layer-1 functional section 135 through a transport channel.

In addition, the MAC-e functional section 134 is configured to work as a lower layer of the MAC-d functional section 133, and to implement the retransmission control function according to Hybrid ARQ (HARQ) and the transmission rate control function.

Figure 7:
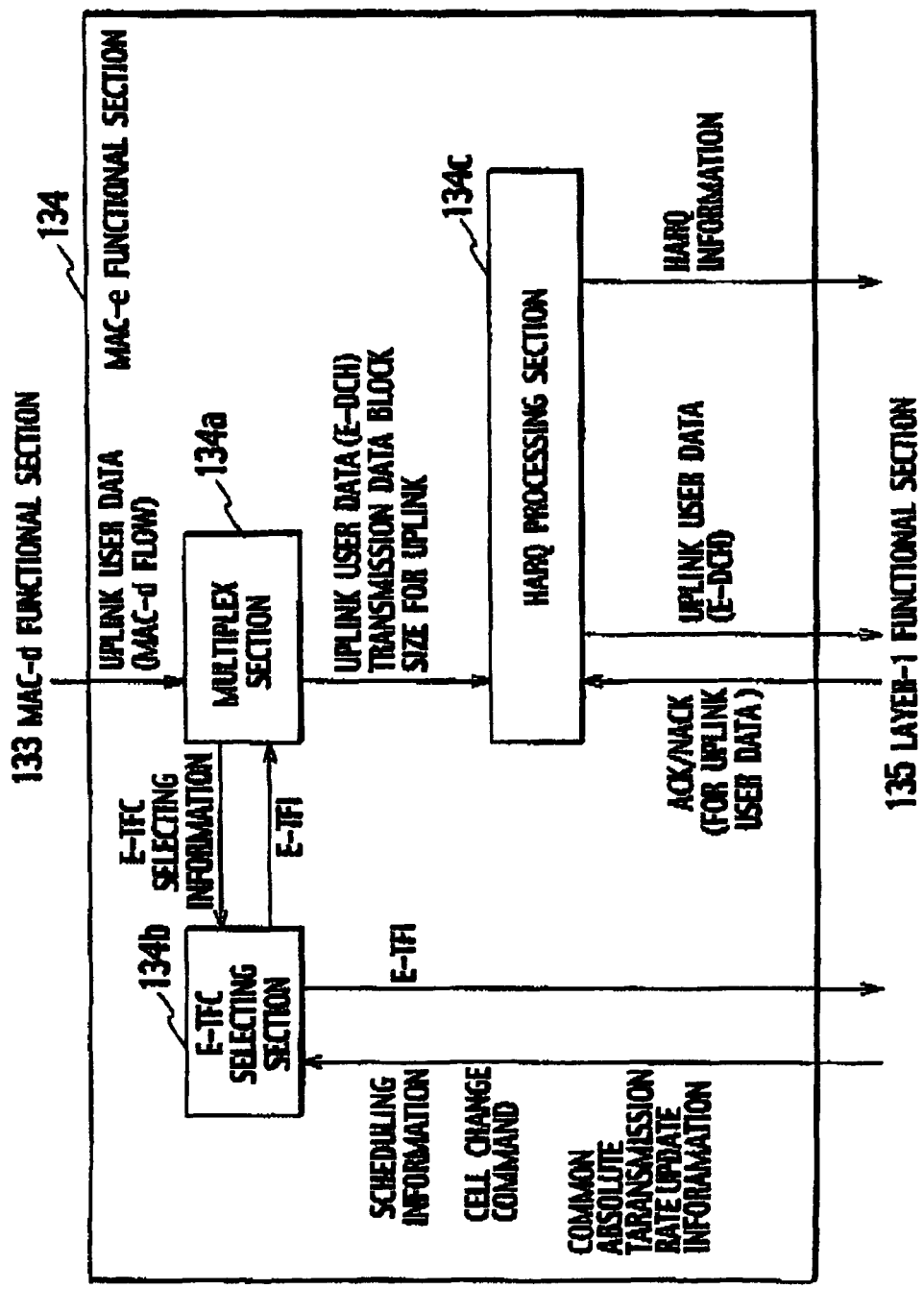
FIG. 7 is a functional block diagram of a MAC-e functional section in the baseband signal processing section of the mobile station in the mobile communication system according to the first embodiment of the present invention.

Specifically, as shown in FIG. 7, the MAC-e functional section 134 is provided with a multiplex section 134a, an E-TFC selecting section 134b, and an HARQ processing section 134c.

The multiplex section 134a is configured to perform a multiplex processing to the uplink user data, which is received from the MAC-d functional section 133 as MAC-d flow, based on a "Enhanced-Transport Format Indicator (E-TFI)" notified from the E-TFC selecting section 134b, so as to generate uplink user data (a Transport Block) to be transmitted via a transport channel (E-DCH). Then, the multiplex section 134a is configured to transmit the generated uplink user data (Transport Block) to the HARQ processing section 134c.

Hereinafter, the uplink user data received as MAC-d flow is indicated as the "uplink user data (MAC-d flow)", and the uplink user data to be transmitted via the transport channel (E-DCH) is indicated as the "uplink user data (E-DCH)".

The E-TFI is an identifier of a transport format, which is a format for providing the transport block on the transport channel (E-DCH) per TTI, and the E-TFI is added to the MAC-e header.

The multiplex section 134a is configured to determine a transmission data block size to be applied for the uplink user data based on the E-TFI notified from the E-TFC selecting section 134b, and to notify the determined transmission data block size to the HARQ processing section 134c.

In addition, when the multiplex section 134a receives the uplink user data from the MAC-d functional section 133 as MAC-d flow, the multiplex section 134a is configured to notify, to the E-TFC selecting section 134b, E-TFC selecting information for selecting a transport format for the received uplink user data.

Here, the E-TFC selecting information includes data size and priority class of the uplink user data, or the like.

Figure 8:
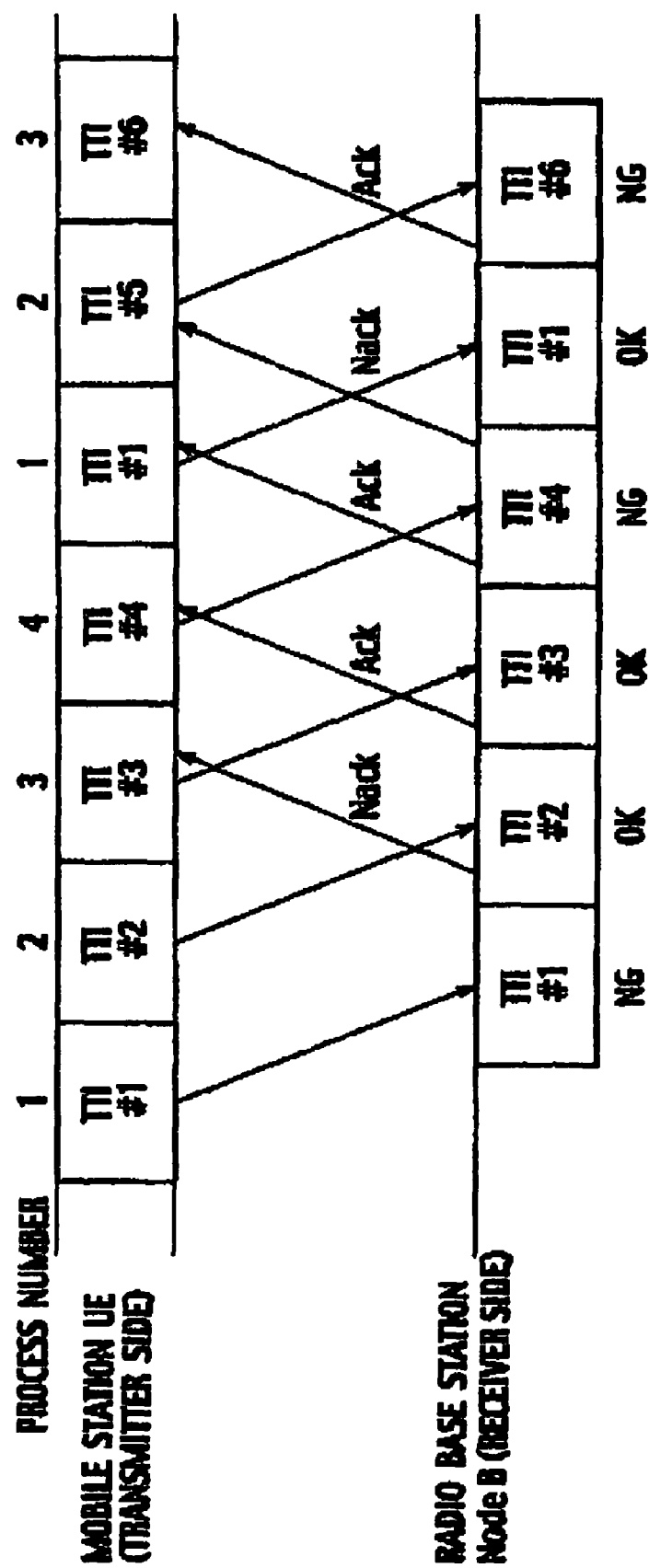
FIG. 8 is a graph illustrating an operation of four channel stop and wait protocol performed by an HARQ processing section in the MAC-e functional section in the baseband signal processing section of the mobile station in the mobile communication system according to the first embodiment of the present invention.

The HARQ processing section 134c is configured to perform the retransmission control processing for the "uplink user data (E-DCH)" according to the "N channel stop and wait (N-SAW) protocol", based on ACK/NACK for the uplink user data notified from the layer-1 functional section 135. An example for operations of the "4 channel stop and wait protocol" is shown in FIG. 8.

In addition, the HARQ processing section 134c is configured to transmit, to the layer-1 functional section 135, the "uplink user data (E-DCH)" received from the multiplex section 134a, and HARQ information (for example, a number for retransmission, and the like) used for the HARQ processing.

The E-TFC selecting section 134b is configured to determine the transmission rate of the uplink user data by selecting the transport format (E-TF) to be applied to the "uplink user data (E-DCH)".

Specifically, the E-TFC selecting section 134b is configured to determine whether the transmission of the uplink user data should be performed or stopped, based on scheduling information, the amount of data in MAC-d PDU, the condition of hardware resource of the radio base station Node b, and the like.

The scheduling information (such as absolute transmission rate and a relative transmission rate of the uplink user data) is received from the radio base station Node B, the amount of data in MAC-d PDU (such as data size of the uplink user data) is passed from the MAC-d functional section 133, and the condition of hardware resource of the radio base station Node B is controlled in the MAC-e functional section 134.

Then, the E-TFC selection section 134b is configured to select the transport format (E-TF) to be applied to transmission of the uplink user data, and to notify the E-TFI for identifying the selected transport format to the layer-1 functional section 135 and the multiplex section 134a.

For example, the E-TFC selecting section 134b is configured to store the transmission rate of uplink user data in association with the transport format, to update the transmission rate of uplink user data based on the scheduling information from the layer-1 functional section 135, and to notify, to the layer-1 functional section 135 and the multiplex section 134a, the E-TFI for identifying the transport format which is associated with the updated transmission rate of uplink user data.

Here, when the E-TFC selecting section 134b receives the absolute transmission rate of the uplink user data from the serving cell for the mobile station via the E-AGCH as the scheduling information, the E-TFC selecting section 134b is configured to change the transmission rate of the uplink user data to the received absolute transmission rate of the uplink user data.

In addition, when the E-TFC selecting section 134b receives the relative transmission rate of the uplink user data (Down command or Don't care command) from the non-serving cell for the mobile station via the E-RGCH as the scheduling information, the E-TFC selecting section 134b is configured to increase/decrease the transmission rate of the uplink user data, at the timing of receiving the relative transmission rate, by the predetermined rate based on the relative transmission rate of the uplink user data.

Further, when the mobile station UE performs the dedicated transmission rate control, the E-TFC selecting section 134b is configured to control the transmission rate of the uplink user data based on the dedicated absolute transmission rate received from the serving cell via the Dedicated E-AGCH.

On the other hand, when the mobile station UE performs the common transmission rate control, the E-TFC selecting section 134b is configured to control the transmission rate of the uplink user data based on the common absolute transmission rate received from the serving cell via the Common E-AGCH.

Here, the Dedicated E-AGCH is configured to be transmitted using the dedicated identifier for the mobile station UE. The Common E-AGCH is configured to be transmitted using the common identifier for the mobile stations which satisfy the predetermined condition (for example, the mobile stations located in the serving cell, or the mobile stations belongs to the specific group).

When the mobile station UE performs the dedicated transmission rate control, the E-TFC selecting section 134b is configured to store the common absolute transmission rate received from the serving cell via the Common E-AGCH.

When the mobile station UE performing the dedicated transmission rate control receives the Dedicated E-AGCH, in which the condition is "Inactive", the E-TFC selecting section 134b is configured to control the transmission rate of the uplink user data based on the stored common absolute transmission rate.

In addition, the mobile station UE can be configured to delete the stored common absolute transmission rate of the uplink user data, when changing the serving cell for the mobile station UE (i.e., when the E-TFC selecting section 134b receives the cell change command from the layer-1 functional section 135).

In addition, the mobile station UE can be configured to update the stored common absolute transmission rate of the uplink user data, based on the update information on the absolute transmission rate of the uplink user data (for example, a common absolute transmission rate update information) which is transmitted from the radio network controller RNC, when changing the serving cell for the mobile station UE (i.e., when the E-TFC selecting section 134b receives the cell change command from the layer-1 functional section 135).

In this specification, the transmission rate of the uplink user data can be a rate which can transmit an uplink user data via an "Enhanced Dedicated Physical Data Channel (E-DPDCH)", a transmission data block size (TBS) for transmitting an uplink user data, a transmission power of an "E-DPDCH", or a transmission power ratio (a transmission power offset) between an "E-DPDCH" and a "Dedicated Physical Control Channel (DPCCH)".

Figure 9:
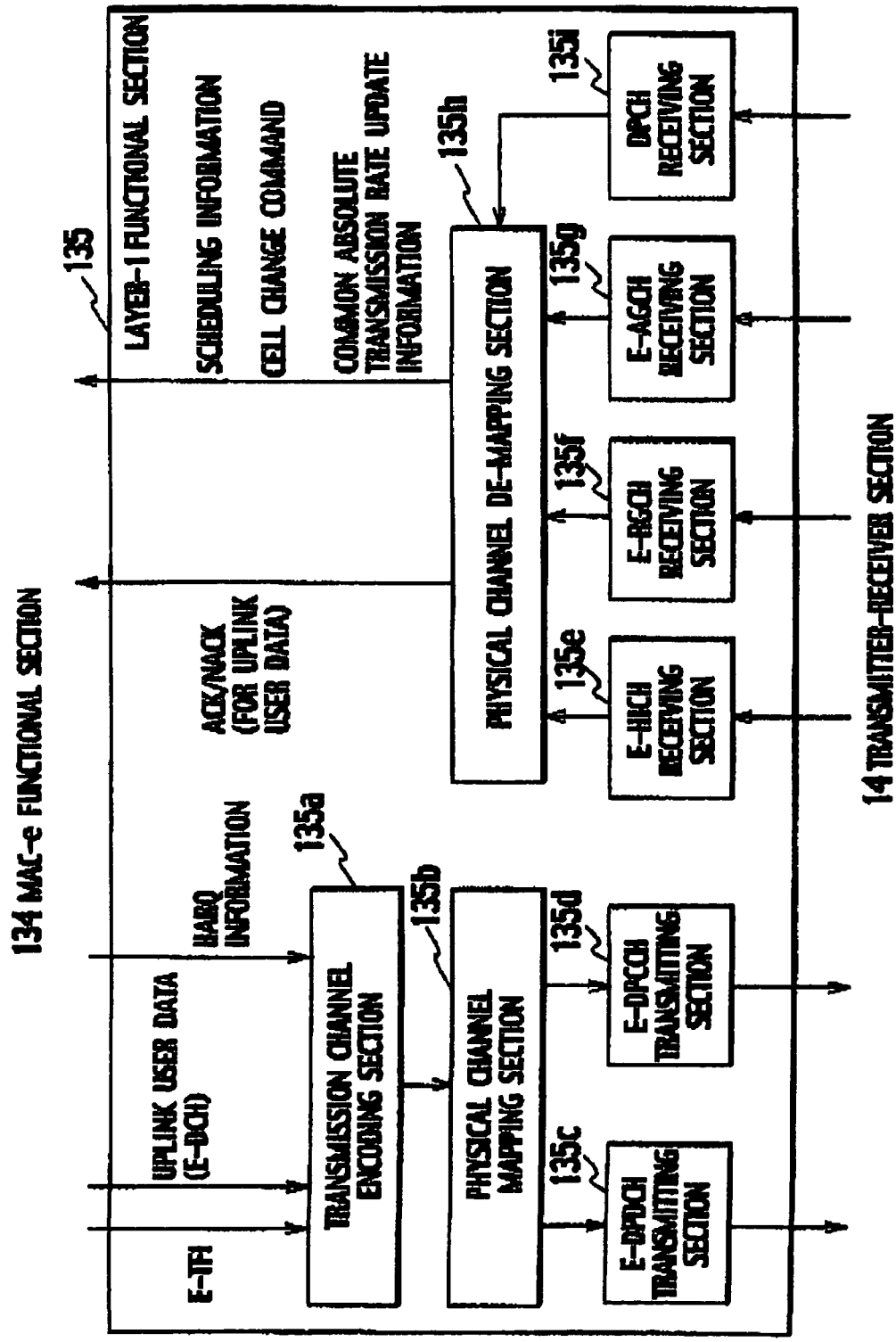
FIG. 9 is a functional block diagram of a layer-1 functional section in the baseband signal processing section of the mobile station in the mobile communication system according to the first embodiment of the present invention.

As shown in FIG. 9, the layer-1 functional section 135 is provided with a transmission channel encoding section 135a, a physical channel mapping section 135b, an E-DPDCH transmitting section 135c, an E-DPCCH transmitting section 135d, an E-HICH receiving section 135e, an E-RGCH receiving section 135f, an E-AGCH receiving section 135g, a physical channel de-mapping section 135h, a DPCH receiving section 135i.

Figure 10:
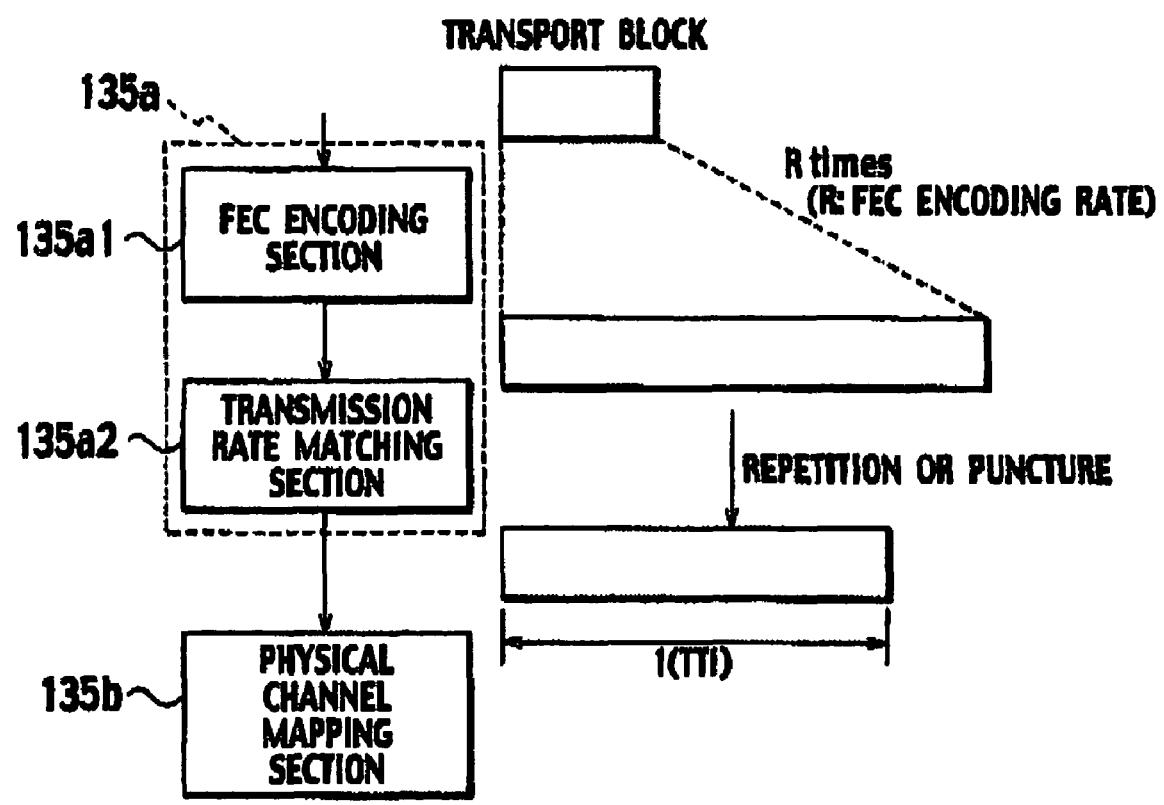
FIG. 10 is a diagram for explaining functions of the layer-1 functional section in the baseband signal processing section of the mobile station in the mobile communication system according to the first embodiment of the present invention.

As shown in FIG. 10, the transmission channel encoding section 135a is provided with a FEC (Forward Error Correction) encoding section 135a1, and a transmission rate matching section 135a2.

As shown in FIG. 10, the FEC encoding section 135a1 is configured to perform the error correction encoding processing toward the "uplink user data (E-DCH)", that is, the transport block, transmitted from the MAC-e functional section 134.

In addition, as shown in FIG. 10, the transmission rate matching section 135a2 is configured to perform, toward the transport block to which the error correction encoding processing is performed, the processing of "repetition (repeat of bit)" and "puncture (bit skipping)" in order to match to the transmission capacity in the physical channel.

The physical channel mapping section 135b is configured to pair the "uplink user data (E-DCH)" from the transmission channel encoding section 135a with the E-DPDCH, and to pair the E-TFI and the HARQ information from the transmission channel encoding section 135a with the E-DPCCH.

The E-DPDCH transmitting section 135c is configured to perform a transmission processing of the E-DPDCCH.

The E-DPCCH transmitting section 135d is configured to perform a transmission processing of the E-DPCCH.

The E-HICH receiving section 135e is configured to receive an "E-DCH HARQ Acknowledgement Indicator Channel (E-HICH)" transmitted from the radio base station Node B.

The E-RGCH receiving section 135f is configured to receive the E-RGCH transmitted from the radio base station Node B (the serving cell and the non-serving cell for the mobile station UE).

The E-AGCH receiving section 135g is configured to receive the E-AGCCH transmitted from the radio base station Node B (the serving cell for the mobile station UE).

Specifically, the E-AGCH receiving section 135g is configured to receive the Dedicated E-AGCH, which is transmitted using the dedicated identifier for the mobile station UE, and the Common E-AGCH, which is transmitted using the common identifier for the mobile stations which satisfy the predetermined condition.

The DPCH receiving section 135i is configured to receive a "Dedicated Physical Channel (DPCH)" transmitted from the radio base Station Node B. Here, the DPCH includes a "Dedicated Physical Data Channel (DPDCH)" and a "Dedicated Physical Control Channel (DPCCH)".

The physical channel de-mapping section 135h is configured to extract the ACK/NACK for the uplink user data which is included in the E-HICH received by the E-HICH receiving section 135e, so as to transmit the extracted ACK/NACK for the uplink user data to the MAC-e functional section 134.

In addition, the physical channel de-mapping section 135h is configured to extract the scheduling information (the relative transmission rate of the uplink user data, that is, UP command/DOWN command) which is included in the E-RGCH received by the E-RGCH receiving section 135f, so as to transmit the extracted scheduling information to the MAC-e functional section 134.

In addition, the physical channel de-mapping section 135h is configured to extract the scheduling information (the absolute transmission rate of the uplink user data) which is included in the E-AGCH received by the E-AGCH receiving section 135g, so as to transmit the extracted scheduling information to the MAC-e functional section 134.

To be more specific, the physical channel de-mapping section 135h is configured to extract the dedicated absolute transmission rate which is included in the Dedicated E-AGCH received by the E-AGCH receiving section 135g, so as to transmit the extracted dedicated absolute transmission rate to the MAC-e functional section 134.

Further, the physical channel do-mapping section 135h is configured to extract the common absolute transmission rate which is included in the Common E-AGCH received by the E-AGCH receiving section 135g, so as to transmit the extracted common absolute transmission rate to the MAC-e functional section 134.

In addition, the physical channel de-mapping section 135h is configured to extract the cell change command and the common absolute transmission rate update information which are included in the DPDCH received by the DPCH receiving section 135i, so as to transmit the extracted cell change command and the common absolute transmission rate update information to the MAC-e functional section 134.

Figure 11:
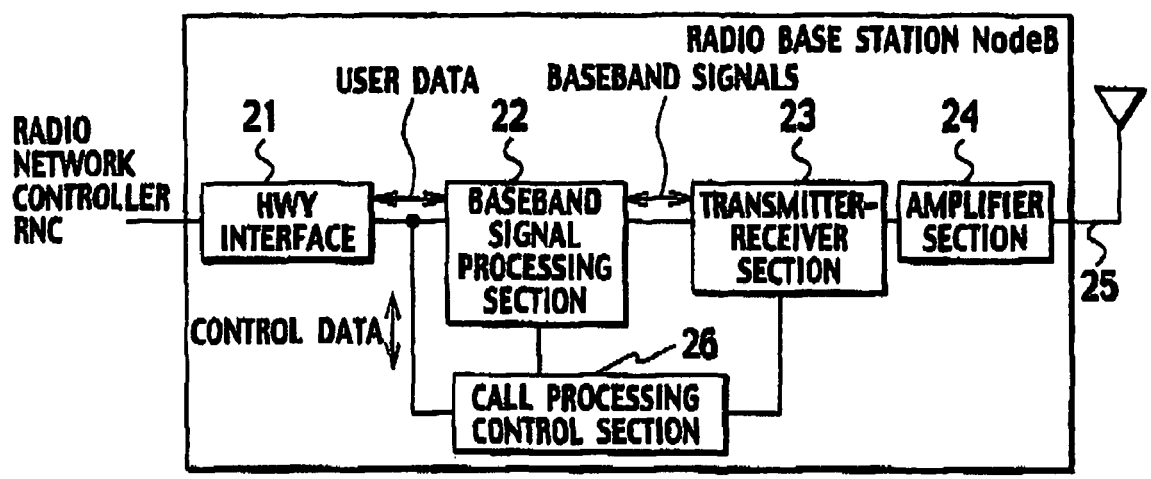
FIG. 11 is a functional block diagram of a radio base station according to the first embodiment of the present invention.

FIG. 11 shows an example of a configuration of functional blocks of a radio base station Node B according to this embodiment.

As shown in FIG. 11, the radio base station Node B according to this embodiment is provided with an HWY interface 21, a baseband signal processing section 22, a transmitter-receiver section 23, an amplifier section 24, a transmission-reception antenna 25, and a call processing control section 26.

The HWY interface 21 is configured to receive downlink user data to be transmitted from the radio network controller RNC, which is located in an upper level of the radio base station Node B, so as to enter the received downlink user data to the baseband signal processing section 22.

In addition, the HWY interface 21 is configured to transmit uplink user data from the baseband signal processing section 22 to the radio network controller RNC.

The baseband signal processing section 22 is configured perform the layer-1 processing such as channel encoding processing, spreading processing, and the like, to the downlink user data, so as to transmit the baseband signal including the downlink user data to the transmitter-receiver section 23.

In addition, the baseband signal processing section 22 is configured to perform the layer-1 processing such as despreading processing, RAKE combining processing, error correction decoding processing, and the like, to the baseband signal, which is acquired from the transmitter-receiver section 23, so as to transmit the acquired uplink user data to the HWY interface 21.

The transmitter-receiver section 23 is configured to convert the baseband signal, which is acquired from the baseband signal processing section 22, to radio frequency signals.

In addition, the transmitter-receiver section 23 is configured to convert the radio frequency signals, which are acquired from the amplifier section 24, to the baseband signals.

The amplifier section 24 is configured to amplify the radio frequency signals acquired from the transmitter-receiver section 23, so as to transmit the amplified radio frequency signals to the mobile station UE via the transmission-reception antenna 25.

In addition, the amplifier section 24 is configured to amplify the signals received by the transmission-reception antenna 25, so as to transmit the amplified signals to the transmitter-receiver section 23.

The call processing control section 26 is configured to transmit/receive the call processing control signals to/from the radio network controller RNC, and to perform the processing of condition control of each function in the radio base station Node B, allocating hardware resource in layer-3, and the like.

Figure 12:
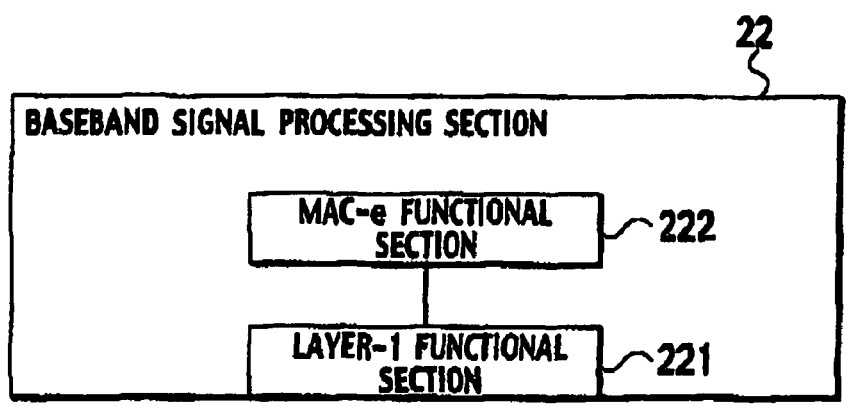
FIG. 12 is a functional block diagram of a baseband signal processing section in the radio base station of the mobile communication system according to the first embodiment of the present invention.

FIG. 12 is a functional block diagram of the baseband signal processing section 22.

As shown in FIG. 12, the baseband signal processing section 22 is provided with a layer-1 functional section 221, and a MAC-e functional section 222.

Figure 13:
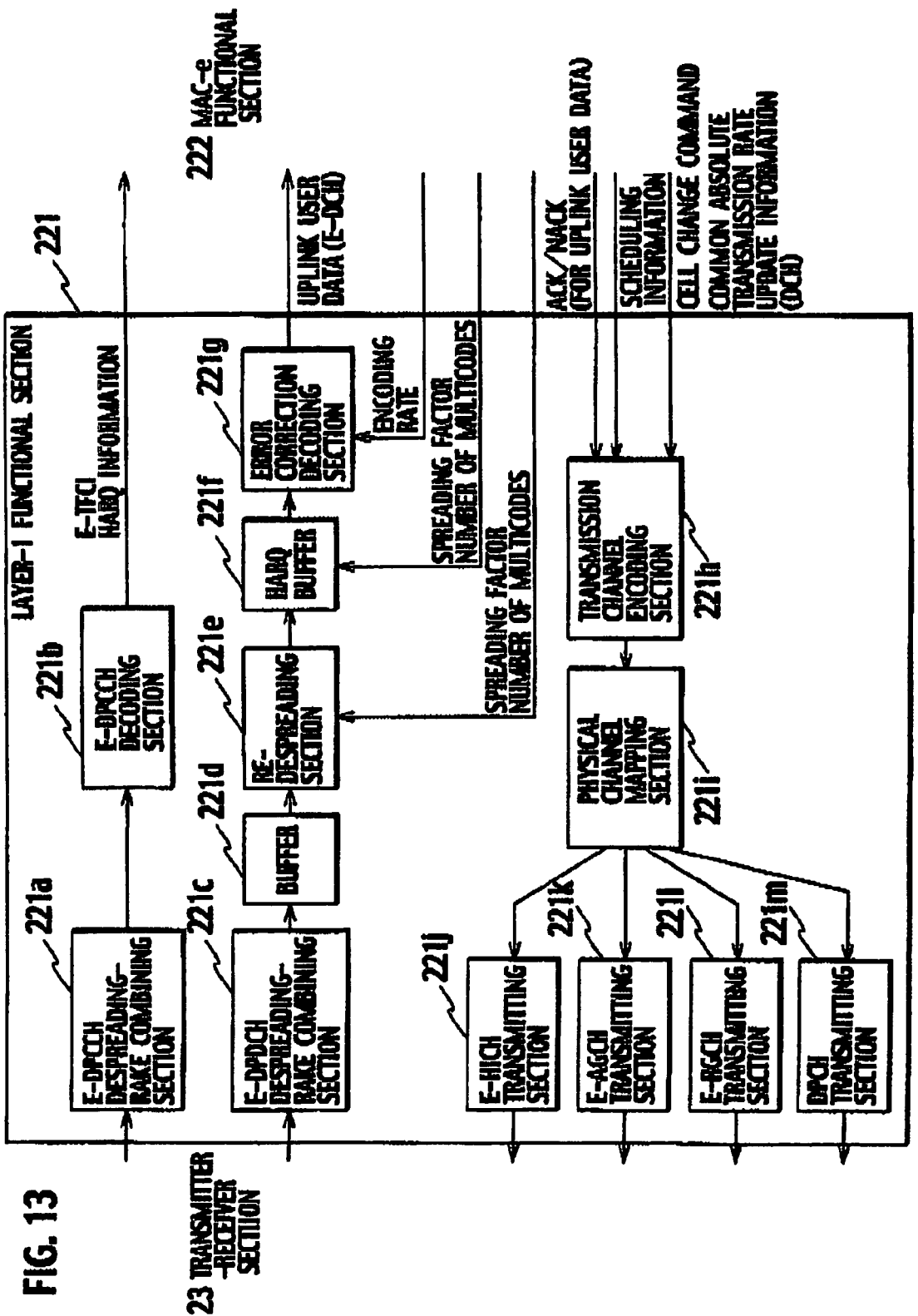
FIG. 13 is a functional block diagram of a layer-1 functional section in the baseband signal processing section in the radio base station of the mobile communication system according to the first embodiment of the present invention.

As shown in FIG. 13, the layer-1 functional section 221 is provided with an E-DPCCH despreading-RAKE combining section 221a, an E-DPCCH decoding section 221b, an E-DPDCH despreading-RAKE combining section 221c, a buffer 221d, a re-despreading section 221e, an HARQ buffer 221f, an error correction decoding section 221g, a transmission channel encoding section 221h, a physical channel mapping section 221i, an E-HICH transmitting section 221j, an E-AGCH transmitting section 221k, an E-RGCH transmitting section 221l, a DPCH transmitting section 221m.

However, these functions do not have to be independently present as hardware. That is, these functions can be partly or entirely integrated, or can be configured through a process of software.

The E-DPCCH despreading-RAKE combining section 221a is configured to perform the despreading processing and RAKE combining processing to the E-DPCCH.

The E-DPCCH decoding section 221b is configured to decode the E-TFCI for determining the transmission rate of the uplink user data (or an "Enhanced Transport Format and Resource Indicator (E-TFRI)" based on the output from the E-DPCCH despreading-RAKE combining section 221a, so as to transmit the decoded E-TFCI to the MAC-e functional section 222.

The E-DPDCH despreading-RAKE combining section 221c is configured to perform the despreading processing to the E-DPDCH using the spreading factor (the minimum spreading factor) and the number of multi-codes which correspond to the maximum rate that the E-DPDCH can use, so as to store the despread data to the buffer 221d. By performing the despreading processing using the above described spreading factor and the number of multi-codes, it is possible for the radio base station Node B to reserve the resources so that the radio base station Node B can receive the uplink data up to the maximum rate (bit rate) that the mobile station UE can use.

The re-despreading section 221e is configured to perform the re-despreading processing to the data stored in the buffer 221d using the spreading factor and the number of multi-codes which are notified from the MAC-e functional section 222, so as to store the re-despread data to the HARQ buffer 221f.

The error correction decoding section 221g is configured to perform the error correction decoding processing to the data stored in the HARQ buffer 221f based on the coding rate which is notified from the MAC-e functional section 222, so as to transmit the acquired "uplink user data (E-DCH)" to the MAC-e functional section 222.

The transmission channel encoding section 221h is configured to perform the necessary encoding processing to the ACK/NACK and the scheduling information for the uplink user data received from the MAC-e functional section 222.

The physical channel mapping section 221i is configured to pair the ACK/NACK for the uplink user data, which is acquired from the transmission channel encoding section 221h, with the E-HICH, to pair the scheduling information (absolute transmission rate), which is acquired from the transmission channel encoding section 221h, with the E-AGCH, and to pair the scheduling information (relative transmission rate), which is acquired from the transmission channel encoding section 221h, with the E-RGCH.

In addition, the physical channel mapping section 221i is configured to pair the cell change command with the DPDCH. The cell change command commands the mobile station UE to perform the processing of changing the serving cell (cell change).

In addition, the physical channel mapping section 221i is configured to pair the common absolute transmission rate update information with the DPDCH. The common absolute transmission rate update information is information for the mobile station UE to update the common absolute transmission rate, which is stored in the mobile station UE, to the transmission rate of the uplink user data to be used when starting the common transmission rate control. For example, the common absolute transmission rate update information includes the transmission rate of the uplink user data to be used when starting the common transmission rate control (primary value).

The E-HICH transmitting section 221j is configured to perform the transmission processing of the E-HICH.

The E-AGCH transmitting section 221k is configured to perform the transmission processing of the E-AGCH.

The E-RGCH transmitting section 221l is configured to perform the transmission processing of the E-RGCH.

Figure 14:
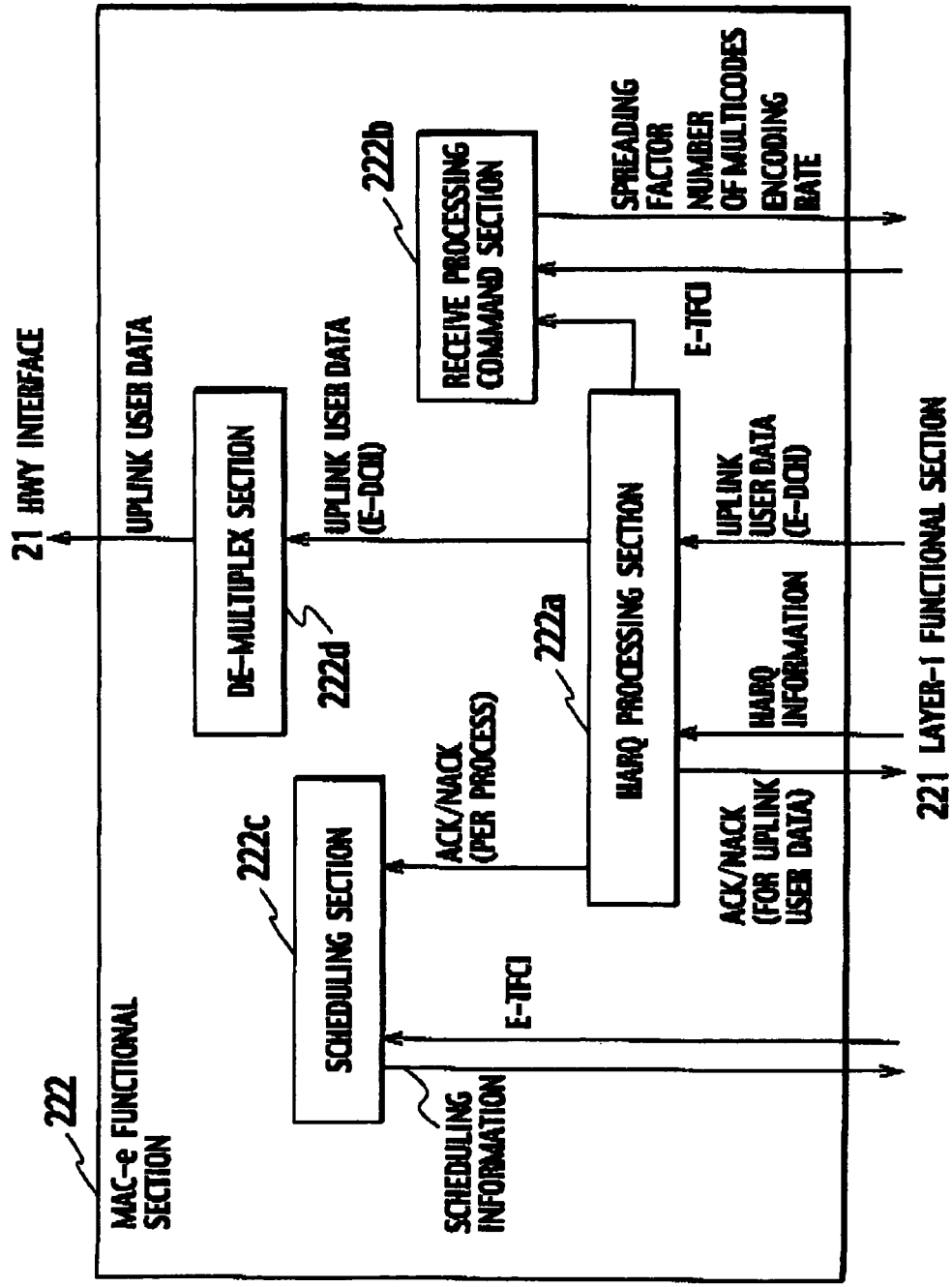
FIG. 14 is a functional block diagram of a MAC-e functional section in the baseband signal processing section in the radio base station of the communication system according to the first embodiment of the present invention.

As shown in FIG. 14, the MAC-e functional section 222 is provided with an HARQ processing section 222a, a receive processing command section 222b, a scheduling section 222c, a de-multiplex section 222d.

The HARQ processing section 222a is configured to receive the uplink user data and the HARQ information which are received from the layer-1 functional section 221, so as to perform the HARQ processing on the "uplink user data (E-DCH)".

In addition, the HARQ processing section 222a is configured to notify, to the layer-1 functional section 221, the ACK/NACK (for the uplink user data) which shows the result of receive processing on the "uplink user data (E-DCH)".

In addition, the HARQ processing section 222a is configured to notify, to the scheduling section 222c, the ACK/NACK (for the uplink user data) per process.

The receive processing command section 222b is configured to notify, to the re-despreading section 221e and the HARQ buffer 221f, the spreading factor and the number of multi-codes for the transport format of each mobile station UE, which is specified by the E-TFCI per TTI received from the E-DPCCH decoding section 221b in the layer-1 functional section 221. Then, the receive processing command section 222b is configured to notify the encoding rate to the error correction decoding section 221g.

The scheduling section 222c is configured to change the absolute transmission rate or the relative transmission rate of the uplink user data, based on the E-TFCI per TTI received from the E-DPCCH decoding section 221 in the layer-1 functional section 221, the ACK/NACK per process received from the HARQ processing section 222a, the interference level, and the like.

In addition, the scheduling section 222c is configured to notify, to the layer-1 functional section 221, the absolute transmission rate or the relative transmission rate of the uplink user data, as the scheduling information.

In addition, the scheduling section 222c is configured to notify, to the layer-1 functional section 221 via the DCH, the dedicated absolute transmission rate of the uplink user data used for the dedicated transmission rate control or the common absolute transmission rate of the uplink user data used for the common transmission rate control.

The de-multiplex section 222d is configured to perform the de-multiplex processing to the "uplink user data (E-DCH)" received from the HARQ processing section 222a, so as to transmit the acquired uplink user data to the HWY interface 21.

The radio network controller RNC according to this embodiment is an apparatus located in an upper level of the radio base station Node B, and is configured to control radio communications between the radio base station Node B and the mobile station UE.

Figure 15:
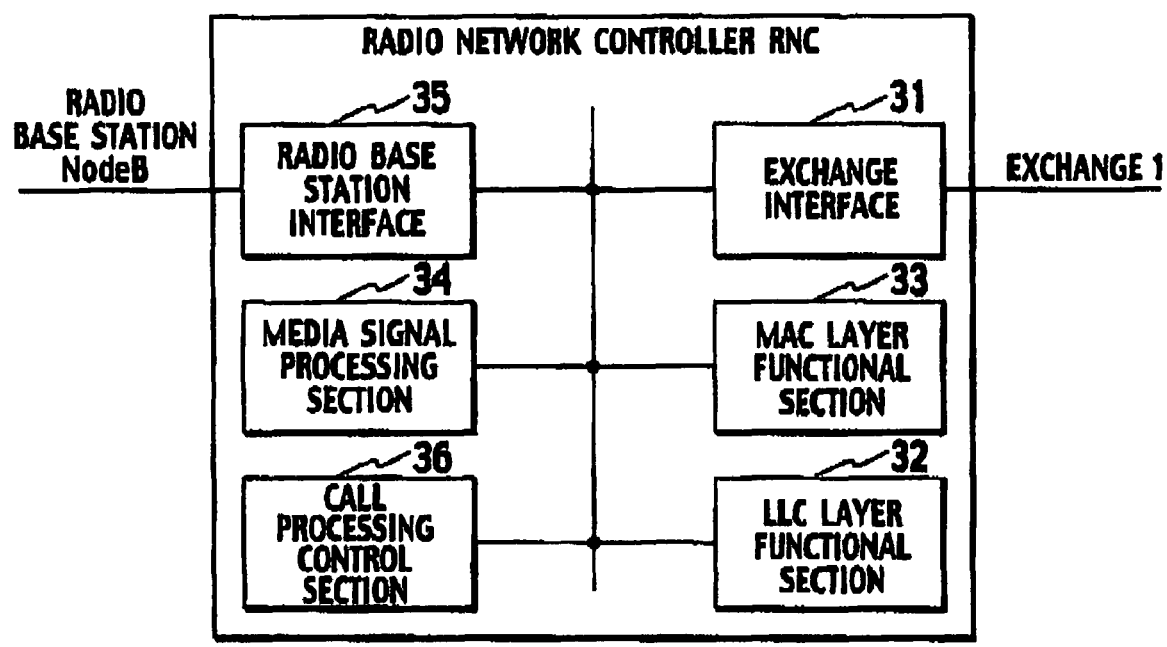
FIG. 15 is a functional block diagram of a radio network controller of the mobile communication system according to the first embodiment of the present invention.

As shown in FIG. 15, the radio network controller RNC according to this embodiment is provided with an exchange interface 31, a Logical Link Control (LLC) layer functional section 32, a MAC layer functional section 33, a media signal processing section 34, a radio base station interface 35, and a call processing control section 36.

The exchange interface 31 is an interface with an exchange 1, and is configured to forward the downlink signals transmitted from the exchange 1 to the LLC layer functional section 32, and to forward the uplink signals transmitted from the LLC layer functional section 32 to the exchange 1.

The LLC layer functional section 32 is configured to perform an LLC sub-layer processing such as a combining processing of a header or a trailer such as a sequence pattern number.

The LLC layer functional section 32 is also configured to transmit the uplink signals to the exchange interface 31 and to transmit the downlink signals to the MAC layer functional section 33, after the LLC sub-layer processing is performed.

The MAC layer functional section 33 is configured to perform a MAC layer processing such as a priority control processing or a header adding processing.

The MAC layer functional section 33 is also configured to transmit the uplink signals to the LLC layer functional section 32 and to transmit the downlink signals to the radio base station interface 35 (or the media signal processing section 34), after the MAC layer processing is performed.

The media signal processing section 34 is configured to perform a media signal processing against voice signals or real time image signals.

The media signal processing section 34 is also configured to transmit the uplink signals to the MAC layer functional section 33 and to transmit the downlink signals to the radio base station interface 35, after the media signal processing is performed.

The radio base station interface 35 is an interface with the radio base station Node B. The radio base station interface 35 is configured to forward the uplink signals transmitted from the radio base station Node B to the MAC layer functional section 33 (or the media signal processing section 34) and to forward the downlink signals transmitted from the MAC layer functional section 33 (or the media signal processing section 34) to the radio base station Node B.

The call processing control section 36 is configured to perform a radio resource control processing, a channel setup and release processing by the layer-3 signaling, or the like. Here, the radio resource control includes call admission control, handover control, or the like.

In addition, the call processing control section 36 is configured to notify the cell change command, which commands the mobile station UE to change the cell.

In addition, the call processing control section 36 can be configured to notify the common absolute transmission rate update information at the same time when notifying the cell change command.

(Operations of Mobile Communication System According to First Embodiment of the Present Invention)

Figure 16:
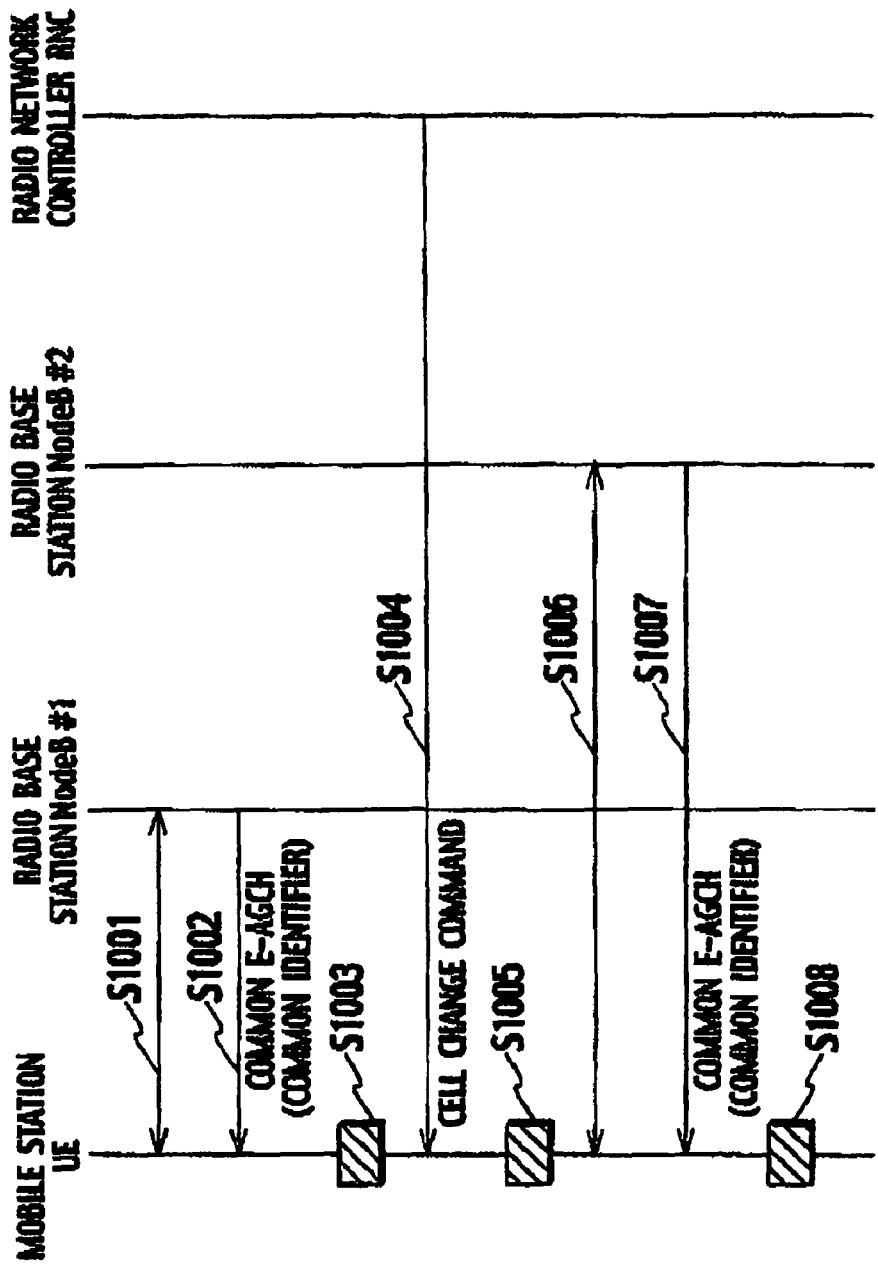
FIG. 16 is a sequence diagram showing operations of transmission rate control method in the mobile communication system according to the first embodiment of the present invention.

Referring to FIGS. 16 and 17, operations of the mobile communication system according to this embodiment will be described. Specifically, the operations of controlling the transmission rate of the uplink user data in the mobile communication system according to this embodiment will be described.

Firstly, referring to FIG. 16, a first example of operation of controlling the transmission rate of the uplink user data in the mobile communication system according to this embodiment will be described.

As shown in FIG. 16, in step S1001, the mobile station UE regards a cell controlled by a radio base station Node B #1 as a serving cell, and is performing radio communications with the serving cell.

In step S1002, the radio base station Node B #1 (the serving cell) transmits the Common E-ACCH to the mobile station UE periodically, or in accordance with the changes in the conditions of radio resources.

In step S1003, the mobile station UE receives and stores the common absolute transmission rate received via the Common E-AGCH for the group (cell) to which the mobile station UE belongs, regardless of whether the mobile station UE performs the dedicated transmission rate control or performs the common transmission rate control.

Here, when the dedicated transmission rate control is performed, the mobile station UE controls the transmission rate of the uplink user data, based on the dedicated absolute transmission rate received via the Dedicated E-AGCH for the mobile station UE.

Then, when the dedicated transmission rate control is switched to the common transmission rate control, the mobile station UE transmits the uplink user data, based on the stored common absolute transmission rate.

In step S1004, the radio network controller RNC transmits the cell change command to the mobile station UE via the radio base station Node B #1. Here, the cell change command includes a command for the mobile station UE to change the serving cell from the cell which is controlled by the radio base station Node B #1 to a cell which is controlled by a radio base station Node B #2.

In step S1005, the mobile station UE receives the above cell change command, and deletes the stored common absolute transmission rate.

In step S1006, the mobile station UE regards the cell controlled by a radio base station Node B #2 as a new serving cell, and starts radio communications with the new serving cell.

In step S1007, the radio base station Node B #2 (the serving cell) transmits the Common E-AGCH to the mobile station UE periodically, or in accordance with the changes in the conditions of radio resources.

In step S1008, the mobile station UE receives and stores the common absolute transmission rate received via the Common E-AGCH for the group (cell) to which the mobile station UE belongs, regardless of whether the mobile station UE performs the dedicated transmission control or performs the common transmission rate control.

Secondly, referring to FIG. 17, a second example of operation of controlling the transmission rate of the uplink user data in the mobile communication system according to this embodiment will be described.

As shown in FIG. 17, in step S2001, the mobile station UE regards a call controlled by a radio base station Node B #1 as a serving cell, and is performing radio communications with the serving cell.

In step S2002, the radio base station Node B #1 (the serving cell) transmits the Common E-AGCH to the mobile station UE periodically, or in accordance with the changes in the conditions of radio resources.

In step S2003, the mobile station UE receives and stores the common absolute transmission rate received via the common E-AGCH for the group (cell) to which the mobile station UE belongs, regardless of whether the mobile station UE performs the dedicated transmission control or performs the common transmission rate control.

Here, when the dedicated transmission rate control is performed, the mobile station UE controls the transmission rate of the uplink user data, based on the dedicated absolute transmission rate received via the Dedicated E-AGCH for the mobile station UE.

Then, when the dedicated transmission rate control is switched to the common transmission rate control, the mobile station UE transmits the uplink user data, based on the stored common absolute transmission rate.

In step S2004, the radio network controller RNC transmits the cell change command to the mobile station UE via the radio base station Node B #1.

Here, the cell change command includes a command for the mobile station UE to change the serving cell from the cell which is controlled by the radio base station Node B #1 to a cell which is controlled by a radio base station Node B #2.

Further, in step S2005, the radio network controller RNC transmits the common absolute transmission rate update information to the mobile station UE.

In step S2006, the mobile station UE receives the above cell change command and the common absolute transmission rate update information, and updates the stored common absolute transmission rate, based on the received common absolute transmission rate update information.

In step S2007, the mobile station UE regards the cell controlled by a radio base station Node B #2 as a new serving cell, and starts radio communications with the new serving cell.

In step S2008, the radio base station Node B #2 (the serving cell) transmits the Common E-AGCH to the mobile station UE periodically, or in accordance with the changes in the conditions of radio resources.

In step S2009, the mobile station UE receives and stores the common absolute transmission rate received via the Common E-AGCH for the group (cell) to which the mobile station UE belongs, regardless of whether the mobile station UE performs the dedicated transmission control or performs the common transmission rate control.

(Effects of Mobile Communication System According to First Embodiment of the Present Invention)

According to the mobile communication system of the present invention, when the mobile station UE receives the cell change command from the radio network controller RNC, the mobile station UE is configured to delete the stored common absolute transmission rate, and to store the new common absolute transmission rate received via the Common E-AGCH, which is transmitted from the current serving cell (changed serving cell). Therefore, it is possible to switch from the dedicated transmission rate control to the common transmission rate control smoothly, and to use a radio resource efficiently.

In addition, according to the mobile communication system of the present invention, when the mobile station UE receives the cell change command from the radio network controller RNC, the mobile station UE is configured to update the stored common absolute transmission rate, based on the common absolute transmission rate update information received from the radio network controller RNC. Therefore, it is possible to switch from the dedicated transmission rate control to the common transmission rate control smoothly, and to use a radio resource efficiently.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission rate control method for controlling, at a mobile station, a transmission rate of uplink user data, based on a first absolute transmission rate of uplink user data received via a first absolute transmission rate control channel which is transmitted using a first identifier for the mobile station or a second absolute transmission rate of uplink user data received via a second absolute transmission rate control channel which is transmitted using a second identifier for mobile stations which satisfy a predetermined condition, comprising:

storing, at the mobile station, the first absolute transmission rate of the uplink user data received via the first absolute transmission rate control channel;

storing, at the mobile station, the second absolute transmission rate of the uplink user data received via the second absolute transmission rate control channel; and deleting at the mobile station, the stored second absolute transmission rate of the uplink user data when changing a serving cell for the mobile station, based on a command from a radio network controller.

2. The transmission rate control method according to claim 1, wherein the mobile station stores the second absolute transmission rate of the uplink user data received via the second absolute transmission rate control channel, even when the mobile station controls the transmission rate of the uplink user data based on the first absolute transmission rate of the uplink user data received via the first absolute transmission rate control channel.

3. A mobile station for controlling a transmission rate of uplink user data, based on a first absolute transmission rate of uplink user data received via a first absolute transmission rate control channel which is transmitted using a first identifier for the mobile station or a second absolute transmission rate of uplink user data received via a second absolute transmission rate control channel which is transmitted using a second identifier for mobile stations which satisfy a predetermined condition, comprising:

a first absolute transmission rate storage configured to store the first absolute transmission rate of the uplink user data received via the first absolute transmission rate control channel;

a second absolute transmission rate storage configured to store the second absolute transmission rate of the uplink user data received via the second absolute transmission rate control channel; and wherein the second absolute transmission rate storage is configured to delete the stored second absolute transmission rate of the uplink user data based on a command from a radio network controller, when a serving cell for the mobile station is changed.

4. The mobile station according to claim 3, wherein the second absolute transmission rate storage is configured to store the second absolute transmission rate of the uplink user data received via the second absolute transmission rate control channel, even when the mobile station controls the transmission rate of the uplink user data based on the first absolute transmission rate of the uplink user data received via the first absolute transmission rate control channel.

* * * * *